United States Patent [19]

Houck

[11] 4,402,300

[45] Sep. 6, 1983

[54] COOKING UNIT, METHOD, AND BURNER ASSEMBLY FOR GRILLING LARGE QUANTITIES OF FOOD

[76] Inventor: Philip I. Houck, 205 7th St., Ocean City, Md. 21842

[21] Appl. No.: 265,157

[22] Filed: May 19, 1981

[51] Int. Cl.³ .................. A47J 37/00; A47J 37/08
[52] U.S. Cl. .......................... 126/41 R; 126/8; 126/39 E; 126/39 K; 99/393; 99/400
[58] Field of Search ............ 126/8, 25 R, 39 E, 39 K, 126/214 D, 383, 39 R, 41 R, 29, 52, 39 B; 99/393, 400, 401

[56] References Cited

U.S. PATENT DOCUMENTS

| | | | |
|---|---|---|---|
| 1,010,169 | 11/1911 | Noreck | 126/41 R |
| 1,888,616 | 11/1932 | Bocchino | 126/41 R X |
| 1,964,372 | 6/1934 | Tygart | 126/41 R |
| 2,542,335 | 2/1951 | Kapit et al. | 126/41 R |
| 2,790,434 | 4/1957 | Del Francia | 126/41 R |
| 2,898,846 | 8/1959 | Del Francia | 126/41 R |
| 3,257,935 | 6/1966 | Temperato | 126/41 R |
| 3,547,097 | 12/1970 | Rice | 126/41 R |
| 3,590,726 | 7/1971 | Warner | 126/25 R |
| 3,638,634 | 2/1972 | Bolitho | 126/41 R |
| 3,638,635 | 2/1972 | Drennan | 126/41 R |
| 3,692,351 | 9/1972 | Christopher | 126/41 R |
| 3,809,051 | 5/1974 | Giroux | 126/25 R |
| 3,989,028 | 11/1976 | Berger | 126/41 R |

OTHER PUBLICATIONS

"Man'f. Lit. Describing Bakers Pride Series SGBR Broiler".
"Man'f. Lit. Describing Bakers Pride Series CH".
"Man'f. Lit. Describing Bakers Pride Series LD/HD".

Primary Examiner—Samuel Scott
Assistant Examiner—G. Anderson
Attorney, Agent, or Firm—Fleit, Jacobson & Cohn

[57] ABSTRACT

An electric cooking unit, a gas-fired cooking unit, and a burner assembly usable with the gas-fired unit for rapidly grilling food in a controlled manner. The cooking unit includes side walls defining a heating enclosure, a plurality of food holding members supported by top surfaces of the side walls for positioning food within the heating enclosure, a coal grate assembly mounted within the heating enclosure for supporting a bed of refractory coals below the food holding members, and gas-fired or electric heating elements for heating the bed of refractory coals to incandescent temperatures. When the cooking unit is gas-fired, the unit incudes a plurality of individually controllable burner assemblies, each assembly having a flame guard assembly releasably mounted on a tubular member having a plurality of apertures for distributing a cooking gas within the heating enclosure. The flame guard assembly has a shield positioned above the tubular member so that hot combustion products flow upwardly around side edges of the shield to heat the refractory coals. The cooking unit and a method using the cooking unit are designed for rapidly heating large quantities of food product, such as pieces of beef and ham having pre-cooked weights greater than five pounds.

15 Claims, 4 Drawing Figures

COOKING UNIT, METHOD, AND BURNER ASSEMBLY FOR GRILLING LARGE QUANTITIES OF FOOD

BACKGROUND OF THE INVENTION

1. Field of the Invention

The present invention relates to the rapid cooking of large quantities of relatively large pieces of meat, such as top round having a pre-cooked weight of approximately ten pounds and hams. More particularly, the invention provides a cooking unit, a method using the cooking method, and a gas-fired burner assembly for rapidly cooking large quantities of food product.

2. Description of the Prior Art

So-called "bull roasts" are well known in which large quantities of meat are grilled over a heating enclosure containing a bed of charcoal. Conventionally, the cooking enclosure is set up for the bull roast and disassembled after use. Because of fire regulations and sanitation requirements, it is difficult to use the units on a permanent basis. Because of the grease falling from the meat being cooked, control of the charcoal fire can be quite difficult.

Portable grilles using charcoal or gas fuel are also known for cooking relatively small quantities of food. Representative patents include U.S. Pat. No. 1,010,169 which describes a gas-fired broiler; U.S. Pat. No. 1,964,372 which describes a barbecue oven designed for cooking a single large piece of meat; U.S. Pat. No. 2,542,335 which describes a gas-fired broiler unit; U.S. Pat. No. 2,790,434 which describes a broiler having independently controlled units for heating a ceramic bed; U.S. Pat. No. 3,257,935 which describes a gas-fired hamburger broiler; U.S. Pat. No. 3,638,635 which describes a gas burner having independently controlled burner portions; U.S. Pat. No. 3,809,051 which describes a portable barbecue oven; and U.S. Pat. No. 3,989,028 which describes a coal grate construction for gas-fired grilles.

SUMMARY OF THE INVENTION

The present invention provides an improved cooking unit for grilling large quantities of food over a bed of refractory coals, a burner assembly usable with the cooking unit, and a method using either a gas-fired or electric cooking unit for grilling large quantities of food product.

The cooking unit provided by the present invention is intended for a permanent or semi-permanent installation that can be used on a repetitive basis. The unit is especially designed for using gas to cook large pieces of meat, such as top round having a pre-cooked weight of approximately ten pounds and hams of approximately the same size, in approximately two hours, and for maintaining cooked meat warm.

One embodiment of the present invention provides a gas-fired cooking unit for grilling food over a radiant bed of refractory coals. The unit has side walls that cooperate with each other to define a cooking or heating enclosure. A plurality of food holding members extend across the heating enclosure and have end portions resting on flat top surfaces of the side walls. The lengths of the food holding members are preferably greater than the distance between outer edges of the side walls so that the ends of the members can be grasped to reposition the food being cooked. Preferably, a plurality of individual pieces of meat are skewered on each pair of food holding members. The members, which may be stainless steel rods, are rotatable with respect to each other to position a different surface of the meat closest to the bed of refractory coals. A coal grate assembly is mounted within the heating enclosure for supporting the bed of refractory coals below the meat. A burner, which can be either gas-fired or electric, is supported below the coal grate assembly for heating the bed of refractory coals to incandescent temperatures. The burners comprise a plurality of spaced-apart elongate burner assemblies that extend between the side walls and are individually controllable so that the rate of cooking of different pieces of meat is adjustable.

When the unit is gas-fired, a burner assembly is provided that includes a tubular member having a plurality of apertures formed therein for distributing a cooking gas. A flame guard assembly is releasably mounted on the tubular member to prevent grease from falling into and blocking the apertures in the tubular member. The flame guard assembly includes an elongate shield with a width sufficient to cover the apertures in the tubular member, support means for spacing the shield vertically above the tubular member, and means for releasably mounting the support means on the tubular member.

Preferably, the shield has a relatively flat elongate central portion so that grease from cooking food falling on the central portion is diverted in a upwards direction to be burned by the hot combustion products or is burned as the grease flows towards side edges of the shield. The grease does not drip in any significant quantity from the shield, but stays on the sheild for a sufficiently long period of time to be burned. There is no requirement to provide a separate grease trap for accumlation of the grease. Also, since there is no grease trap, the problem of flare-up when accumulated grease ignites is virtually eliminated.

Preferably, the shield is releasably mounted on the tubular member for ease of installation and to facilitate its removal for cleaning and appropriate maintenance. For instance, a pair of straps have first ends rigidly connected to the support for the shield and second ends that are connected to each other underneath the tubular member.

To facilitate cleaning and maintenance of the unit, it is preferable that the coal grate assembly be formed of a plurality of individual assemblies. When necessary, the refractory material on one of the individual assemblies is moved onto another of the assemblies. The first assembly is then removed to provide access to the burner assembly underneath the removed coal grate section and to facilitate cleaning of the removed coal grate assembly. After the first coal grate assembly is reinstalled, the material from the second assembly can be shifted onto the first assembly so that the entire assembly can be sequentially removed.

It is also preferable that the side walls defining the cooking enclosure are covered with stainless steel. Also, the coal grate assembly is preferably formed of stainless steel tubular bars. Use of round bars eliminates corners which can accumulate grease and be difficult to clean. Because of the high temperatures used within the cooking enclosure, it is preferable for the flame guard assembly to be formed from stainless steel.

With the method provided by the present invention, several relatively large pieces of meat are skewered onto each pair of stainless steel rods. The ends of the rods are then supported on the top surfaces of walls defining the heating enclosure so that one surface of the skewered meat is positioned above the bed of refractory coals. Th coals are then heated to cook the meat. Individual heat controls are provided to selectively adjust the rate of cooking. For instance, a first set of rods can contain already cooked meat and a second set of rods can contain meat undergoing initial cooking. As the cooking progresses, the rods are rotated about each other to position a different surface of the meat facing the bed of refractory coals. After the internal temperaure of the meat has reached a predetermined temperature; the heat energy supplied to the refractory coals underneath that particular meat is reduced to prevent overcooking of the meat. If desired, an appropriate marinade is applied to prevent excessive drying of the meat.

The invention, and its objects and advantages, will become more apparent in the detailed description of the preferred embodiments hereinafter presented.

BRIEF DESCRIPTION OF THE DRAWINGS

In the detailed description of the preferred embodiments of the invention hereinafter presented, reference is made to the accompanying drawings, in which.

DESCRIPTION OF THE PREFERRED EMBODIMENTS

Figure 1:
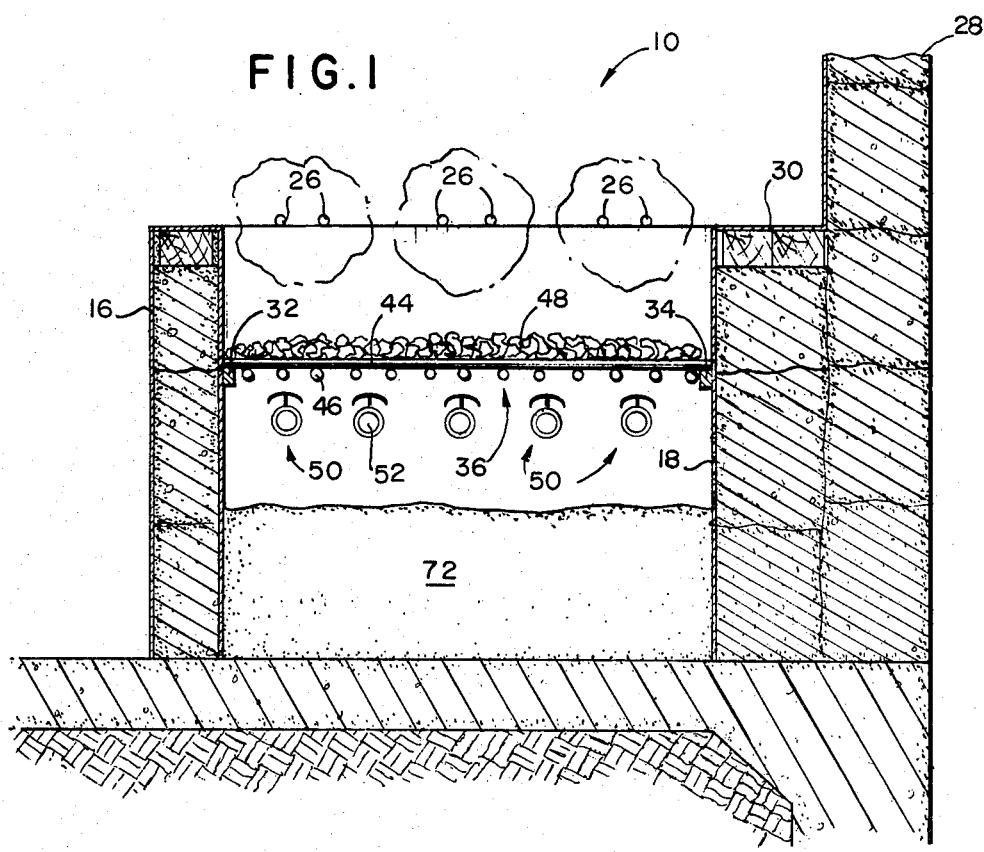
FIG. 1 is a schematic vertical section of one embodiment of a gas-fired cooking unit according to the present invention.

The present description will be directed in particular to elements forming part of, or cooperating more directly with, the present invention. Elements not specifically shown or described herein are understood to be selectable from those known in the art.

Referring now to the drawings, and to FIGS. 1 to 3 in particular, one embodiment of the present invention is illustrated and will be described in connection with a gas-fired cooking unit, generally designated 10.

The cooking unit 10 has a first pair of side walls 12, 14 that cooperate with a second pair of side walls 16, 18 to define a heating enclosure 20. In one embodiment of the invention, the side walls are formed of cinder or masonry block coated with sheets of stainless steel. The side walls 12 and 14 have flat top surfaces 22, 24, respectively, that support end portions of food holding members 26. Preferably, the food holding members are stainless steel tubular bars that have end portions extending beyond outer edges of the side walls. For the purpose of clarity, FIGS. 2 and 4 only illustrate supported end portions of one pair of rods. A rear wall 28 extends upwardly above the side wall 18 to form a barrier between the cooking unit and the building (not shown) containing the cooking unit. Since the rear wall 28 reflects heat, the top surface 30 of side wall 18 forms a warming shelf. Support surfaces 32, 34 are provided on the walls 16, 18, respectively. These support surfaces extend substantially the entire lengths of the side walls.

A coal grate assembly, generally designated 36, is supported on the surfaces 32 and 34. Preferably, the assembly 36 is formed of a plurality of individual sections 38, 40, and 42. Each of the individual assemblies is formed of a plurality of members 44 that extend between and rest on the support surfaces 32 and 34. Preferably, the members 44 are tubular stainless steel bars spaced approximately one inch apart from each other. The members 44 of each of the individual sections are interconnected by a plurality of members 46, which preferably are tubular stainless steel bars. The coal grate assembly 36 supports a bed of refractory material 48. Such bed has not been illustrated in FIGS. 2 and 4 so as to facilitate the illustration of structure positioned underneath the bed.

Figure 2:
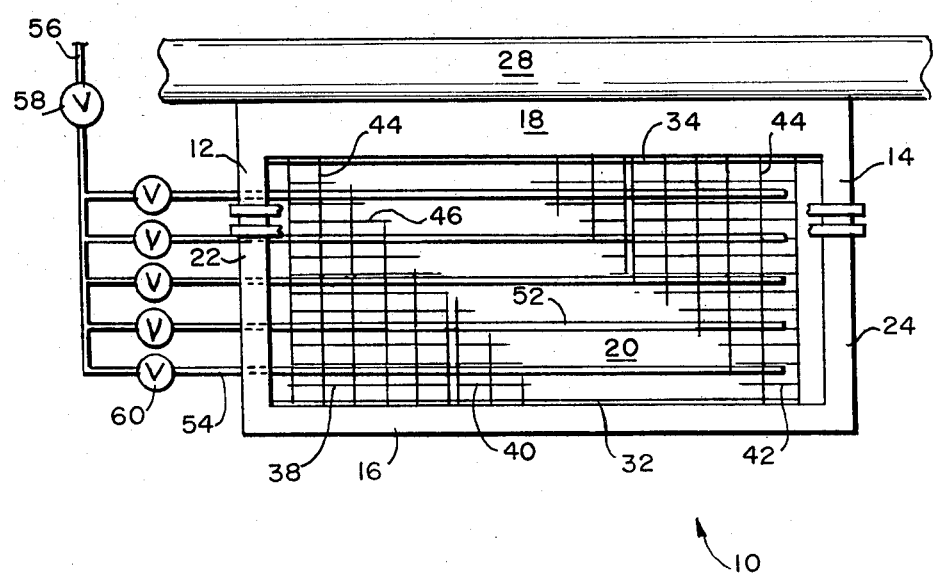
FIG. 2 is a top view of the gas-fired cooking unit of FIG. 1, prior to use.

As best illustrated in FIG. 1, a plurality of burner assemblies, generally designated 50, are positioned underneath the bed 48. Each burner assembly 50 includes an elongate tubular member 52 that extends substantially the entire distance between the side walls 12 and 14. While FIG. 2 illustrates the ends of the tubular members 52 spaced from the side wall 14, it should be readily appreciated that side wall 14 can be modified to provide appropriate support for the tubular members. The other ends 54 of the tubular members protrude beyond the side wall 12 and are connectable to a manifold or source 56 of cooking gas. A main valve 58 controls the supply of the cooking gas to the cooking unit 10. Individual valves 60 are associated with each of the tubular members 52 to selectively control the amount of energy supplied to the portion of the bed located above the particular burner assembly. Preferably, the valves 60 are spaced from the side wall 12 to isolate the valves from portions of the tubular members heated by combustion within the heating enclosure 20.

Figure 3:
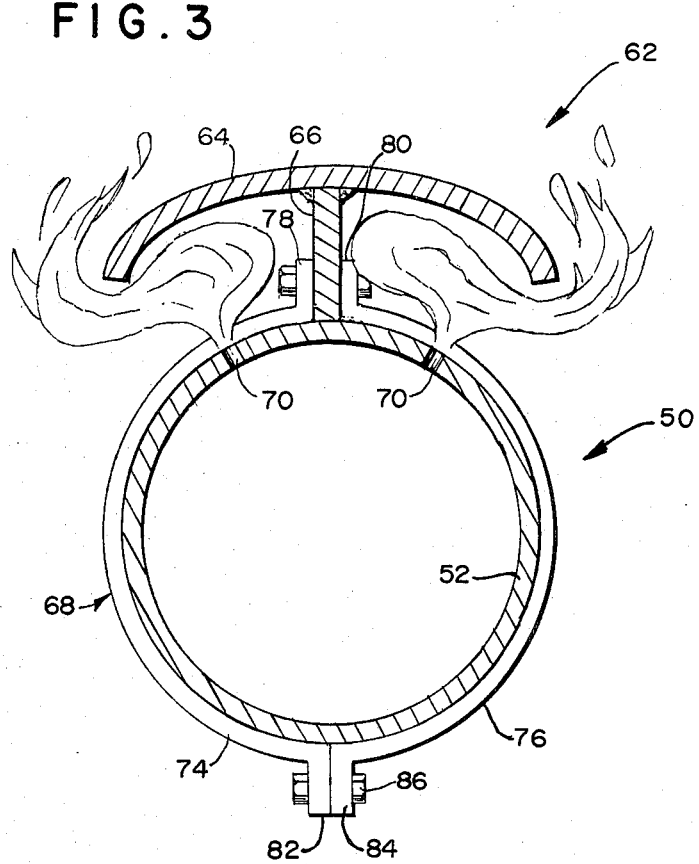
FIG. 3 is an enlarged sectional view of one embodiment of a burner assembly usable with the gas-fired cooking unit of FIG. 1.

As illustrated in FIG. 3, each of the burner assemblies 50 includes a flame guard assembly, generally designated 62. The flame guard assembly includes an elongate shield member 64, a support 66 for spacing the shield vertically above the tubular member, and means 68 for releasably mounting the support 66 on the tubular member 52. The distance between side edges of the shield 64 is greater than the distance between apertures 70 formed in the tubular member 52 that introduce cooking gas into the heating enclosure. As a result, grease falling from food being cooked is prevented from clogging the apertures 70. Preferably, the shield 64 is relatively flat so that grease falling onto the shield is either diverted in an upward direction or remains on the shield and is burned as it flows towards the shield side edges. Relatively small amounts of the grease fall from the side edges into the bed 72 of sand or other suitable material positioned under the burner assemblies 50.

It has been found that the spacing between the shield 64 and the tubular member 52 is an important feature contributing to the efficiency of the present invention. If the spacing is too great, the cooking gas is contained within the shield and does not adequately heat the bed 48 of refractory material. If the shield is too close, there is an adverse impact on combustion efficiency. When the spacing is correct, the combustion products "roll" around side edges of the shield, as illustrated in FIG. 3.

It is preferable to releasably mount the shield 64 on the tubular member 52. Such releasable mounting facilitates construction of the cooking unit 10 and makes it easier to thoroughly clean the unit. A suitable mount is a pair of straps 74, 76. First ends 78, 80, respectively, of the straps are connected to the support 66 by a bolt-and-nut connection, by welding, or by any other suitable means. Second ends 82, 84, respectively, of the straps are provided with aligned apertures for receiving a nut-and-bolt connection 86. Use of such connection facilitates easy attachment and removal of the burner assembly 50 from the tubular member 52.

In one embodiment of the invention, the tubular member has a nominal diameter of two inches; the height of the support 66 is between ½ inch and 1½ inches, with 1 inch being a preferred height; and the top of the shield 64 is spaced 1½ inches from the bottom of the coal grate assembly 36. With this embodiment, 400 to 500 pounds of meat are cooked in approximately 2 hours cooking time.

Figure 4:
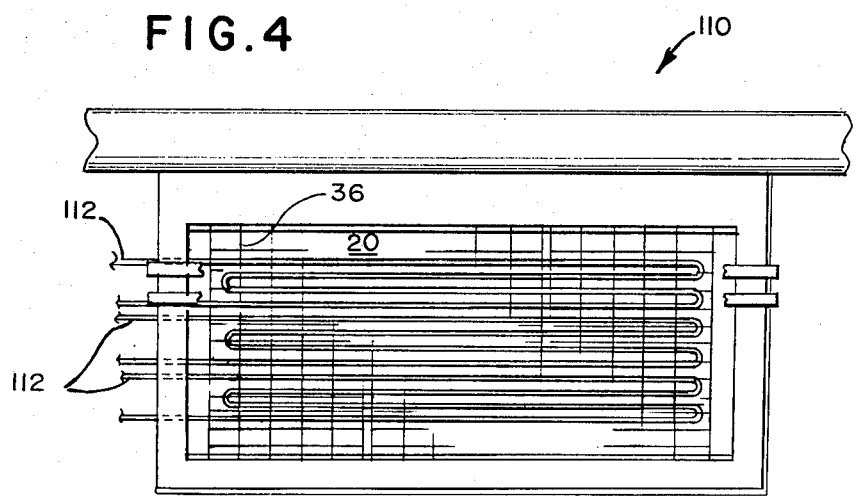
FIG. 4 is a view similar to FIG. 2 of another embodiment of the present invention.

In use, pieces of food to be cooked, such as top round having a pre-cooked weight of approximately ten pounds and hams, are skewered on a pair of food holding members 26. The number of pieces skewered on each pair of rods is a function of the distance between the side walls 12 and 14, the size of the individual pieces of meat, and anticipated demand for the cooked product. End portions of the rods, as illustrated in FIGS. 2 and 4, are positioned on the flat top surfaces 22 and 24 of the side walls. Valves 58 and 60 are approximately adjusted to furnish cooking gas to one or more of the burner assemblies 50. If only a limited amount of meat is to be cooked, cooking gas is furnished only to a selected one or two of the tubular members. Alternatively, if some of the meat has been cooked earlier or has already reached a desired internal temperature, the supply of cooking gas fed to the burner assembly aligned with the rods supporting the cooked meat is reduced so as to warm the meat, without excessive cooking.

Use of a pair of food holding members to support each piece of meat prevents uncontrolled rotation of the meat. During a first portion of a cooking operation, the food holding members locate one surface of the meat facing the bed of refractory material. As the cooking operation proceeds, an appropriate marinade is applied to the meat to prevent excessive drying. Also, the rods are rotated with respect to each other to position an opposite surface of the meat facing the bed of refractory material. In this manner, even, controlled cooking of the meat is obtained. During the cooking operation, the internal temperature of the meat is sensed or measured. When the internal temperature reaches a predetermined value, the supply of cooking gas furnished to the particular burner assembly or assemblies heating the meat is reduced to prevent excessive cooking of the meat. Preferably, a small amount of cooking gas is furnished to the associated burner assemblies to maintain the meat warm.

Referring now to FIG. 4 of the drawings, another cooking unit according to the present invention is illustrated. The cooking unit, which is generally designated 110, is similar to the previously described cooking unit 10. The main difference between the units 10 and 110 is that the unit 110 utilizes a plurality of separate electric heating coils 112 to heat the bed of refractory material, while the unit 10 uses a cooking gas. The coils 112, which are individually controllable, are positioned beneath a coal grate assembly 36 that supports a bed of refractory material (not illustrated in FIG. 4). As with the unit 10, surfaces of the side walls forming the heating enclosure 20 support end portions of food holding members or stainless steel rods 26.

The use of the cooking unit 110 is essentially the same as the use of the cooking unit 10. Thus, the method of using the embodiment of FIG. 4 will not be described in detail.

Since the unit 110 utilizes an electric heating coil, there is no necessity with this embodiment of the invention to provide flame guard assemblies.

Previously, specific embodiments of the present invention have been described. It should be appreciated, however, that these embodiments have been described for the purposes of illustration only, without any intention of limiting the scope of the present invention. For instance, the individual heating coils 112 of the embodiment illustrated in FIG. 4 can be formed as straight heating elements extending through one of the side walls towards the other, instead of extending in the serpentine fashion illustrated in FIG. 4. It is the intention that the present invention be limited only by the appended claims.

What is claimed is:

1. A gas-fired cooking unit for grilling food over a radiant bed of refractory coals comprising:
   a first pair of parallel side walls having flat top surfaces;
   a second pair of parallel side walls cooperating with said first pair to define a heating enclosure;
   a plurality of food holding members extending across said heating enclosure and having end portions resting on the flat top surfaces of said first pair of parallel side walls, the lengths of said food holding members being greater than the distance between other edges of said first pair of parallel side walls;
   a coal grate assembly mounted within said heating enclosure for supporting a bed of refractory coals below the food holding members in position to direct radiant cooking heat upward toward food supported by said food holding members;
   burner means supported below said coal grate assembly for heating the bed of refractory coals to incandescent temperatures, said burner means comprising a plurality of spaced apart elongate burner assemblies extending between one of said pairs of side walls, each of said burner assemblies comprising a tubular member having a plurality of apertures formed therein for distributing a cooking gas, valve means for controlling the rate of flow of cooking gas through the tubular member, and a flame guard assembly releasably mounted on said tubular member;
   said flame guard assembly comprising an elongate shield having a width sufficient to cover the apertures formed in said tubular member for preventing grease from cooking food falling into said apertures, support means for spacing said shield vertically above said tubular member so that hot combustion products flow upwardly around side edges of said shield, and means for releasably mounting said support means on said tubular member; and
   a bed of absorbent material positioned below said burner assemblies for absorbing drippings falling from food being cooked to thereby prevent accumulation of excess flammable material below the food being cooked.

2. A gas-fired cooking unit according to claim 1, wherein said shield has a relatively flat elongate centeral portion so that grease from cooking food falling on the central portion is diverted in an upward direction to be burned by the hot combustion products or is burned as the grease flows towards side edges of said shield.

3. A gas-fired cooking unit according to claim 1 or 2, wherein said means for releasably mounting comprises a pair of straps extending around said tubular member and having first ends rigidly connected to said support means, second ends of said straps being positionable adjacent each other; and means for releasably connecting said second ends to each other to thereby releasably mount said flame guard assembly on said tubular member.

4. A gas-fired cooking unit according to claim 3, wherein walls of one of said pairs of parallel side walls have support surfaces protruding inwardly for supporting said coal grate assembly, and wherein said coal grate assembly comprises a plurality of separate assemblies removably mounted within said heating enclosure, each separate assembly comprising a first plurality of tubular bars for supporting the bed of refractory coals and having end portions resting on and supported by said support surfaces, and a second plurality of tubular bars positioned below and connected to said first plurality of bars for rigidifying said separate assembly.

5. A gas-fired cooking unit according to claim 3, wherein said food holding members are elongate stainless steel rods arranged in pairs, said burner assemblies being arranged to provide different levels of heat energy to respective ones of said pairs of rods.

6. A gas-fired cooking unit according to claim 1, wherein at least one of said first pair and at least one of said second pair of parallel side walls have stainless steel exterior surfaces.

7. A gas-fired cooking unit according to claim 6, wherein said food holding members are elongate stainless steel rods arranged in pairs, said burner assemblies being arranged to provide different levels of heat energy to respective ones of said pairs of rods.

8. A gas-fired cooking unit according to claim 6 or 7, wherein said shield has arcuate side edge portions extending outwardly and downwardly from an elongated flat central portion of the shield so that grease falling on said shield is directed upwardly after contacting the shield or flows slowly towards side edges of the shield whereby substantially all of the grease falling from the food is burned before reaching the bottom of the heating enclosure.

9. A gas-fired cooking unit according to claim 1, wherein said burner assemblies of said burner means are sized to provide sufficient cooking gas to simultaneously cook a plurality of pieces of meat having precooked weights of approximately ten pounds in approximately two hours.

10. A gas-fired cooking unit according to claim 1, wherein said absorbent material is sand.

11. A gas-fired cooking unit according to claim 1, wherein said shield and said support means of said flame guard assembly are formed of stainless steel.

12. A gas-fired cooking unit for grilling food over a radiant bed of refractory coals comprising:
 a first pair of parallel side walls having flat top surfaces;
 a second pair of parallel side walls cooperating with said first pair to define a heating enclosure, said side walls having confronting stainless steel exterior surfaces;
 a plurality of stainless steel rods for holding food within the heating enclosure, the rods extending across said heating enclosure and having end portions resting on the flat top surfaces of said first pair of parallel side walls;
 a coal grate assembly comprised of a plurality of individual units mounted within said heating enclosure for supporting a bed of refractory coals below the rods in position to direct radiant cooking heat upwards towards food supported by said rods;
 burner means supported below said coal grate assembly for heating the bed of refractory coals to incandescent temperatures, said burners means comprising a plurality of spaced apart elongate burner assemblies extending from one of said side walls of one of said pairs to the other side wall of said one of said pairs, each of said burner assemblies comprising a tubular member having a plurality of apertures formed therein for distributing a cooking gas and an end portion positioned outside of said heating enclosure connectable to a source of cooking gas, valve means for controlling the rate of flow of cooking gas through the tubular member, and a flame guard assembly releasably mounted directly on said tubular member;
 said flame guard assembly comprising an elongate shield having a width sufficient to cover the apertures formed in said tubular member for preventing grease from cooking food falling into said apertures, the shield being relatively flat so that grease falling thereon is burned before flowing over side edges of the shield, support means extending between said shield and said tubular member for spacing said shield vertically above said tubular member so that hot combustion products flow upwardly around side edges of said shield to thereby heat the bed of refractory coals, and means for releasably mounting said support means on said tubular member; and
 a bed of absorbent material positioned below said burner assemblies for absorbing drippings falling from food being cooked to thereby prevent accumulation of excess flammable material below the food being cooked.

13. A gas-fired cooking unit according to claim 12, wherein said burner assemblies of said burner means are sized to provide sufficient cooking gas to simultaneously cook a plurality of pieces of meat having precooked weights of approximately ten pounds in approximately two hours.

14. A gas-fired cooking unit according to claim 12, wherein said absorbent material is sand.

15. A gas-fired cooking unit according to claim 12, wherein said shield and said support means of said flame guard assembly are formed of stainless steel.

* * * * *